(12) United States Patent
Arimilli et al.

(10) Patent No.: US 6,212,616 B1
(45) Date of Patent: Apr. 3, 2001

(54) EVEN/ODD CACHE DIRECTORY MECHANISM

(75) Inventors: Ravi Kumar Arimilli, Austin; John Steven Dodson, Pflugerville; Jerry Don Lewis, Round Rock, all of TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/046,009

(22) Filed: Mar. 23, 1998

(51) Int. Cl.[7] .................................................. G06F 12/00
(52) U.S. Cl. .......................................... 711/220; 711/128
(58) Field of Search .................................. 711/3, 128, 220

(56) References Cited

U.S. PATENT DOCUMENTS

| | | | |
|---|---|---|---|
| 4,151,593 | * 4/1979 | Jenkins et al. | 711/167 |
| 4,441,155 | * 4/1984 | Fletcher et al. | 711/3 |
| 4,768,148 | * 8/1988 | Keeley et al. | 711/141 |
| 4,785,395 | * 11/1988 | Keeley | 711/122 |
| 5,479,641 | * 12/1995 | Nadir et al. | 711/128 |
| 5,761,714 | * 6/1998 | Liu et al. | 711/127 |

FOREIGN PATENT DOCUMENTS 4-205449   11/1990   (JP) ................................ G06F/12/08

* cited by examiner

Primary Examiner—John W. Cabeca
Assistant Examiner—Brian R. Peugh
(74) Attorney, Agent, or Firm—Volel Emile; Felsman, Bradley, Vaden, Gunter & Dillon, LLP

(57) ABSTRACT

The index field of an address maps to low order cache directory address lines. The remaining cache directory address line, the highest order line, is indexed by the parity of the address tag for the cache entry to be stored to or retrieved from the corresponding cache directory entry. Thus, even parity address tags are stored in cache directory locations with zero in the most significant index/address bit, while odd parity address tags are stored in cache directory locations with one in the most significant index/address bit. The opposite arrangement (msb 1=even parity; msb 0=odd parity) may also be employed, as may configurations in which parity supplies the least significant bit rather than the most significant bit. In any of these cases, even/odd parity is implied based on the location of the address tag within the cache directory. In associative caches, the mechanism may be configured so that even parity address tags are stored in one set of congruence classes (rows) or congruence class members (columns) of the cache directory, while odd parity address tags are stored in another set. The parity of an address tag field within a presented address is also utilized to test the parity of an address tag stored in the indexed location, with address tag and parity matches indicating a cache hit. In the described example, the implied parity mechanism disclosed saves about $\frac{1}{12}$th (approximately 9%) of the cache directory array space required over configurations requiring stored parity associated with each cache directory entry. Furthermore, this mechanism improves delays within critical cache directory access paths.

26 Claims, 3 Drawing Sheets

EVEN/ODD CACHE DIRECTORY MECHANISM

BACKGROUND OF THE INVENTION

1. Technical Field

The present invention relates in general to caches in data processing systems and in particular to cache directory addressing and parity checking schemes for caches. Still more particularly, the present invention relates to a cache directory addressing and parity checking scheme which reduces the data storage size for caches in data processing systems.

2. Description of the Related Art

Contemporary data processing systems commonly employ caches for staging data from system memory to the processor(s) with reduced access latency. Such caches typically employ a parity checking mechanism within the cache directory. FIG. 3 depicts a cache directory addressing and parity checking scheme for a 32 bit data processing system using a 1 MB. The 1 MB cache directory addressing configuration employs a 64 byte cache line. A cache line is the block of memory which a coherency state describes, also referred to as a cache block. When addressing the cache, bits 26–31 (6 bits) of the address specify an intra-cache line address, bits 12–25 (14 bits) of the address are utilized as an index to cache lines in the cache directory and the cache memory, and bits 0–11 (12 bits) of the address utilized as the cache line address tag. The intra-cache line address field allows a particular byte to be selected from a cache line. The index field specifies a row (or congruence class) within the cache directory and memory. The address tag field also identifies a particular cache line. The address tag is stored within the cache directory entry corresponding to the cache line containing the data associated with the address. Matching the address tag field of an address to the contents of a cache directory entry verifies that the correct cache entry is being selected.

In the known art, an address index field (address bits [12–25]) is utilized by cache directory 302 to select a entry 302a within cache directory 302. The address index field maps to address lines 0–13 of cache directory 302 and cache memory (not shown). The selected cache directory entry 302a contains a 12-bit address tag 302b and a parity bit 302c. Parity bit 302c within cache directory entry 302a contains the parity of address tag 302b. Address tag 302b is passed to comparator 304 for comparison with the address tag field (address bits [0–11]) of an address presented. Address tag 302b and parity bit 302c are passed together to parity checking logic 306 to verify address tag 302b. Parity checking logic 306 computes the parity of address tag 302b and compares the result with parity bit 302c, generating a signal 308 indicating whether a match is detected.

One problem with the approach to implementing a cache directory addressing and parity checking system of the type described above is the additional cache directory space required to associate a parity bit with address tags in each cache entry. It would be desirable, therefore, to provide a cache directory addressing and parity checking scheme which did not require parity bit storage in the cache directory. It would further be advantageous if the cache directory addressing and parity checking scheme utilized did not require novel parity generation and/or checking logic. It would further be advantageous for the mechanism to improve delay within critical cache directory access paths.

SUMMARY OF THE INVENTION

It is therefore one object of the present invention to provide an improved cache for use in data processing systems.

It is another object of the present invention to provide an improved cache directory addressing and parity checking scheme for caches.

It is yet another object of the present invention to provide a cache directory addressing and parity checking scheme which reduces the data storage size for caches in data processing systems.

It is still another object of the present invention to provide a cache directory addressing and parity checking scheme which improves delays within critical cache directory access paths.

The foregoing objects are achieved as is now described. The index field of an address maps to low order cache directory address lines. The remaining cache directory address line, the highest order line, is indexed by the parity of the address tag for the cache entry to be stored to or retrieved from the corresponding cache directory entry. Thus, even parity address tags are stored in cache directory locations with zero in the most significant index/address bit, while odd parity address tags are stored in cache directory locations with one in the most significant index/address bit. The opposite arrangement (msb 1=even parity; msb 0=odd parity) may also be employed, as may configurations in which parity supplies the least significant bit rather than the most significant bit. In any of these cases, even/odd parity is implied based on the location of the address tag within the cache directory. In associative caches, the mechanism may be configured so that even parity address tags are stored in one set of congruence classes (rows) or congruence class members (columns) of the cache directory, while odd parity address tags are stored in another set. The parity of an address tag field within a presented address is also utilized to test the parity of an address tag stored in the indexed location, with address tag and parity matches indicating a cache hit. In the described example, the implied parity mechanism disclosed saves about $\frac{1}{12}$th (approximately 9%) of the cache directory array space required over configurations requiring stored parity associated with each cache directory entry. Furthermore, this mechanism improves delays within critical cache directory access paths.

The above as well as additional objects, features, and advantages of the present invention will become apparent in the following detailed written description.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
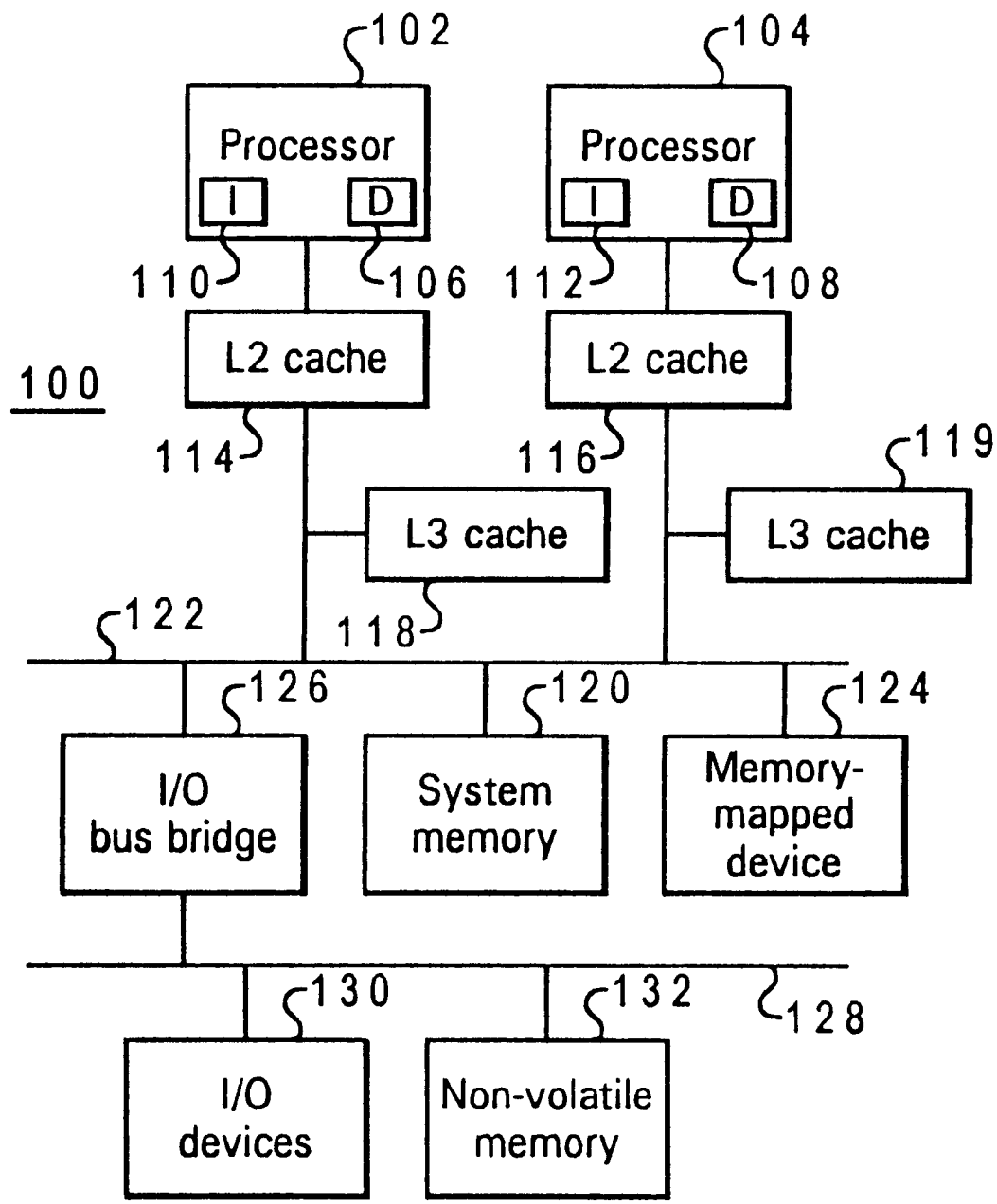
FIG. 1 depicts a multiprocessor data processing system in accordance with a preferred embodiment of the present invention.

With reference now to the figures, and in particular with reference to FIG. 1, a multiprocessor data processing system in accordance with a preferred embodiment of the present invention is depicted. Data processing system 100 is a symmetric multiprocessor (SMP) system including a plurality of processors 102 and 104, which preferably comprise one of the PowerPC™ family of processors available from International Business Machines of Armonk, N.Y. Although only two processors are depicted in the exemplary embodiment, those skilled in the art will appreciate that additional processors may be utilized in a multiprocessor data processing system in accordance with the present invention.

Each processor 102 and 104 includes a level one (L1) data cache 106 and 108, respectively, and an L1 instruction cache 110 and 112, respectively. Although illustrated as bifurcated instruction and data caches in the exemplary embodiment, those skilled in the art will recognize that a single, unified L1 cache may be implemented. In order to minimize data access latency, one or more additional levels of cache memory may be implemented within data processing system 100, such as level two (L2) caches 114 and 116 and level three (L3) caches 118 and 119. The lower cache levels—L2 and L3—are employed to stage data to the L1 caches and typically have progressively larger storage capacities but longer access latencies. For example, data caches 106 and 108 and instruction caches 110 and 112 may each have a storage capacity of 32 KB and an access latency of approximately 1–2 processor cycles. L2 caches 114 and 116 might have a storage capacity of 512 KB but an access latency of 5 processor cycles, while L3 caches 118 and 119 may have a storage capacity of 4 MB but an access latency of greater than 15 processor cycles. L2 caches 114 and 116 and L3 caches 118 and 119 thus serve as intermediate storage between processors 102 and 104 and system memory 120, which typically has a much larger storage capacity but may have an access latency of greater than 50 processor cycles.

Both the number of levels in the cache hierarchy and the cache hierarchy configuration employed in data processing system 100 may vary. L2 caches 114 and 116 in the example shown are dedicated caches connected between their respective processors 102 and 104 and system memory 120 (via system bus 122). L3 caches 118 and 119 are depicted as lookaside caches logically vertical with L2 caches 114 and 116. As a result, data or instructions may be looked up one of L2 caches 114 or 116 and one of L3 caches 118 and 119 simultaneously, although the data or instructions will only be retrieved from L3 cache 118 or 119 if the respective L2 cache 114 or 116 misses while L3 cache 118 or 119 hits. Those skilled in the art will recognize that various permutations of levels and configurations depicted may be implemented.

L2 caches 114 and 116 and L3 caches 118 and 119 are connected to system memory 120 via system bus 122. Also connected to system bus 122 may be a memory mapped device 124, such as a graphics adapter providing a connection for a display (not shown), and input/output (I/O) bus bridge 126. I/O bus bridge 126 couples system bus 122 to I/O bus 128, which may provide connections for I/O devices 130 and nonvolatile memory 132. System bus 122, I/O bus bridge 126, and I/O bus 128 thus form an interconnect coupling the attached devices, for which alternative implementations are known in the art. I/O devices 130 comprise conventional peripheral devices including a keyboard, a graphical pointing device such as a mouse or trackball, a display, and a printer, which are interfaced to I/O bus 128 via conventional adapters. Non-volatile memory 132 may comprise a hard disk drive and stores an operating system and other software controlling operation of system 100, which are loaded into volatile system memory 120 in response to system 100 being powered on. Those skilled in the art will recognize that data processing system 100 may include many additional components not shown in FIG. 1, such as serial and parallel ports, connections to networks or attached devices, a memory controller regulating access to system memory 120, etc. Such modifications and variations are within the spirit and scope of the present invention.

A typical communications transaction on system bus 122 includes a source tag indicating a source of the transaction and an address and/or data. Each device connected to system bus 122 preferably snoops all communication transactions on system bus 122, intervening in communications transactions intended for other recipients when necessary and reproducing changes to system memory data duplicated within the device when feasible and appropriate.

Figure 2:
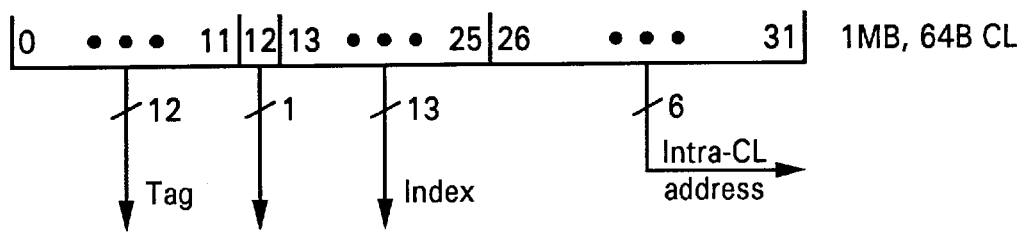
FIG. 2 is a diagram of a cache configuration for a cache directory addressing and parity checking scheme in accordance with a preferred embodiment of the present invention.
Figure 2:
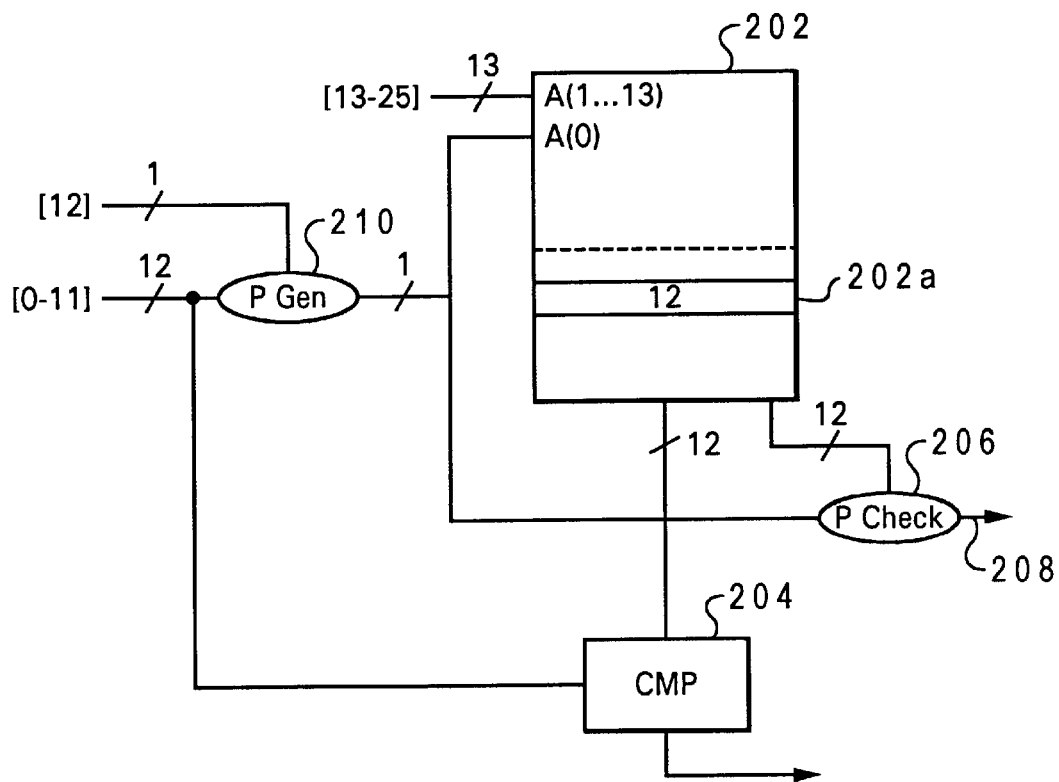
Figure 3:
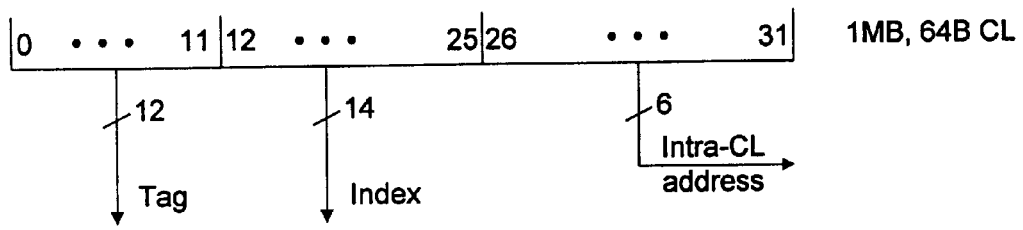
FIG. 3 depicts a prior art cache directory addressing and parity-checking scheme.
Figure 3:
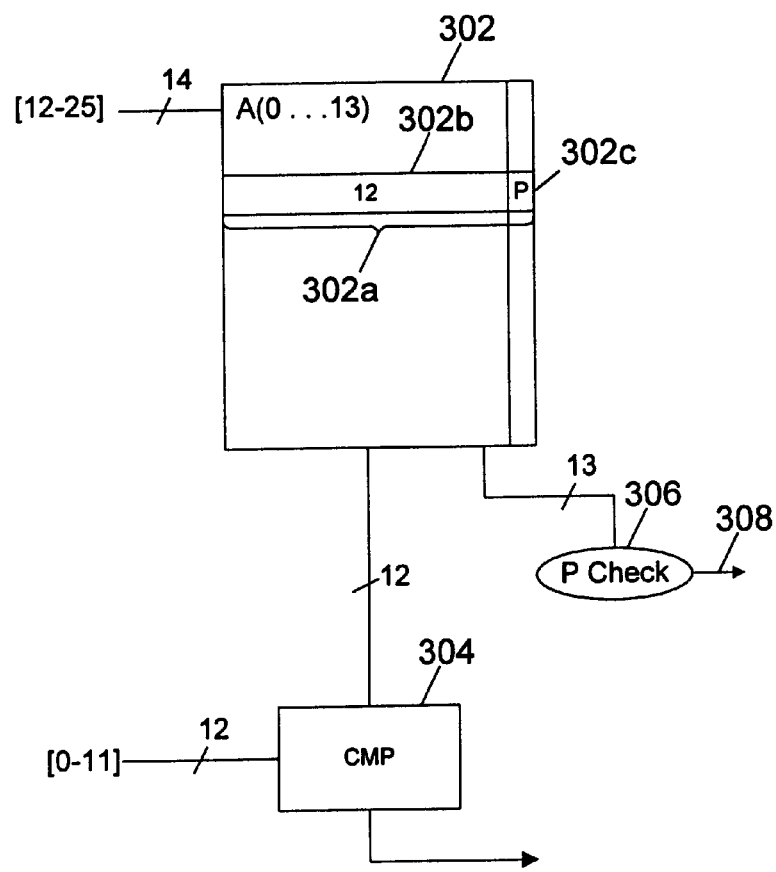

Referring to FIG. 2, a diagram of a cache configuration for a common cache directory addressing and parity checking scheme in accordance with a preferred embodiment of the present invention is illustrated. The cache directory configuration depicted may be utilized for any cache depicted in FIG. 1, including L2 caches 114 and 116 and L3 caches 118 and 119. The exemplary embodiment of the cache directory addressing scheme described relates to a 1 MB cache, a size which may be best suited for implementation as L2 cache 114 or 116 or L3 cache 118 or 119. However, the cache directory addressing and parity checking scheme of the present invention may be implemented for any size cache at any level of a data processing system's storage hierarchy.

FIG. 2 depicts a cache directory addressing and parity checking system for a 32 bit data processing system using a 1 MB cache with a 64 byte cache line. Bits 26–31 (6 bits) of the address specify an intra-cache line address. A smaller index field, bits 13–25 (12 bits), of the address is utilized as an index to entries in the cache directory and cache lines in the cache memory. Bits 0–11 (12 bits) of the address utilized as the cache line address tag.

The address index field (address bits [13–25]) is utilized by cache directory 202 to select a entry 202a within cache directory 202. The address index field maps to address lines 1–13 of cache directory 202 and cache memory (not shown). As with the prior art, a selected cache directory entry 202a contains a 12-bit address tag passed to comparator 204 for comparison with the address tag field (address bits [0–11]) of an address presented and to parity checking logic 206, which generates a signal 208 indicating whether the parity of the address tag from the cache directory entry 202a matches the proper parity. Unlike the prior art, however, no parity bit is associated with the cache directory entry 202a. Instead, parity is implied by the cache directory index for the cache location containing the matching address tag.

In order to achieve implied parity, the address tag field (address bits [0–11]) is utilized by parity generator 210 to compute the parity of the address tag. The result is used as the remaining address bit (address bit zero) of the cache directory entry 202a containing the corresponding tag. A plus-even/minus-odd parity scheme results. That is, address tags having even parity are stored in cache directory entries having positive addresses (0X XXXX XXXX XXXX) while address tags having odd parity are stored in entries having negative addresses (1X XXXX XXXX XXXX). The cache directory and memory are thus effectively split, one half having address tags with even parity and one half having address tags with odd parity.

Although the most significant cache directory address bit is employed in the exemplary embodiment, the least significant bit may also be utilized. In that instance, every other line within the cache directory would contain an address tag with even parity (locations with the address XX XXXX XXXX XXX0, for example), with the remaining alternating lines containing address tags having odd parity (such as locations with the address XX XXXX XXXX XXX1).

The parity computed by parity generator 210 is also passed to parity checking logic 206, which computes the parity of the address tag within the selected cache entry 202*a* to verify the match. Parity generator 210 and parity checking logic 206 may be formed in accordance with the known art. Thus, no special parity logic is required for the parity checking mechanism of the present invention. Although depicted as utilized outside cache directory 202, parity checking logic 206 may alternatively be employed within cache directory 202 between the storage arrays and the selection logic at the output.

The present invention is illustrated above in the context of a non-associative cache. However, the addressing and parity checking mechanism of the present invention may be employed with associative caches with equal facility. In associative caches, the parity-based addressing scheme of the present invention may be utilized to select congruence classes (rows) as part of the directory index, so that even parity address tags are stored in one set of congruence classes while odd parity address tags are stored in another set of congruence classes. Alternatively, the parity-based addressing scheme may be employed to select members of congruence classes (columns) as a multiplexer input, so that even parity address tags are stored in one set of congruence class members while odd parity address tags are stored in another set of congruence class members.

By eliminating the need for a parity bit associated with each address tag, the implied parity mechanism of the present invention achieves about a 1/12th (approximately 9%) savings in array space for the cache directory. Thus, larger caches may be employed in the same area, or caches of equal size may be implemented within a smaller area, than cache designs requiring storage of a parity bit. Additionally, since the cache directory is indexed, at least in part, based on parity of the address tags stored in the cache, a larger cache may be implemented for a particular address size.

Address bit zero may be implemented within the cache directory arrays as a "late select" as known in the art. This allows cache directory access (Add[1–13]) to occur parallel to the parity generation logic, eliminating any additional delay to the critical cache directory access paths. Furthermore, actual cache directory access is improved by reduction of the number of bits per entry (13 to 12) and the physical reduction in overall cache directory size.

While the invention has been particularly shown and described with reference to a preferred embodiment, it will be understood by those skilled in the art that various changes in form and detail may be made therein without departing from the spirit and scope of the invention.

What is claimed is:

1. A method of addressing a cache directory, comprising:
computing a parity of an address tag field within a presented address;
computing an index including:
the computed parity within a bit of the index; and
an index field within the presented address within remaining bits of the index; and
selecting a cache directory entry utilizing the computed index.

2. The method of claim 1, wherein the step of computing an index further comprises:
utilizing the computed parity as a most significant bit within the index.

3. The method of claim 1, wherein the step of computing an index further comprises:
utilizing the computed parity as a least significant bit within the index.

4. The method of claim 1, further comprising:
computing a parity of an address tag stored in the selected cache directory entry; and
comparing the parity of the address tag stored in the selected cache directory entry to the parity of the address tag field within the presented address.

5. The method of claim 4, further comprising:
comparing the address tag stored in the selected cache directory entry to the address tag field within the presented address.

6. The method of claim 5, further comprising:
responsive to the address tag stored in the selected cache directory entry matching the address tag field within the presented address and the parity of the address tag stored in the selected cache directory entry matching the parity of the address tag field within the presented address, indicating a cache hit.

7. The method of claim 5, further comprising:
responsive to the address tag stored in the selected cache directory entry not matching the address tag field within the presented address, indicating a cache miss.

8. The method of claim 5, further comprising:
responsive to the parity of the address tag stored in the selected cache directory entry matching the parity of the address tag field within the presented address, indicating a cache miss.

9. The method of claim 1, wherein the step of selecting a cache directory entry utilizing the computed index further comprises:
selecting a congruence class including the cache directory entry utilizing the computed index.

10. A cache directory addressing mechanism, comprising:
a parity generator computing a parity of an address tag field within a presented address; and
a cache directory computing an index including:
the computed parity within a bit of the index; and
an index field within the presented address within remaining bits of the index,
wherein the cache directory selects a cache directory entry utilizing the computed index.

11. The mechanism of claim 10, wherein the computed parity is utilized as a most significant bit within the index.

12. The mechanism of claim 10, wherein the computed parity is utilized as a least significant bit within the index.

13. The mechanism of claim 10, further comprising:
parity checking logic computing a parity of an address tag stored in the selected cache directory entry and comparing the parity of the address tag stored in the selected cache directory entry to the parity of the address tag field within the presented address.

14. The mechanism of claim 13, further comprising:
a comparator comparing the address tag stored in the selected cache directory entry to the address tag field within the presented address.

15. The mechanism of claim 14, further comprising:
a cache controller signalling a cache hit in response to the address tag stored in the selected cache directory entry matching the address tag field within the presented address and the parity of the address tag stored in the selected cache directory entry matching the parity of the address tag field within the presented address.

16. The mechanism of claim 14, further comprising:

a cache controller signalling a cache miss in response to the address tag stored in the selected cache directory entry not matching the address tag field within the presented address.

17. The mechanism of claim 14, further comprising:

a cache controller signalling a cache miss in response to the parity of the address tag stored in the selected cache directory entry matching the parity of the address tag field within the presented address.

18. The mechanism of claim 10, wherein the cache directory selects a congruence class including the cache directory entry utilizing the computed index.

19. A method of addressing a cache directory, comprising:

computing a parity of an address tag field within a presented address; and selecting a cache directory entry utilizing the computed parity and an index field within the presented address as an index to the cache directory.

20. The method of claim 19, wherein the step of selecting a cache directory entry utilizing the computed parity and an index field within the presented address as an index to the cache directory further comprises:

selecting a congruence class including the cache directory entry utilizing the computed parity and a portion of the index field.

21. The method of claim 19, wherein the step of selecting a cache directory entry utilizing the computed parity and an index field within the presented address as an index to the cache directory further comprises:

selecting a congruence class including the cache directory entry utilizing a portion of the index field; and selecting a congruence class member within the selected congruence class utilizing the computed parity and a remaining portion of the index field.

22. The method of claim 19, further comprising:

comparing an address tag within the selected cache directory entry to the address tag field within the presented address;

signalling a cache hit in response to the address tag within the selected cache directory entry matching the address tag field within the presented address; and signalling a cache miss in response to the address tag within the selected cache directory entry not matching the address tag field within the presented address.

23. The method of claim 19, further comprising:

computing a parity of an address tag within the selected cache directory entry;

comparing the parity of the address tag within the selected cache directory entry to the computed parity of the address tag field within the presented address;

signalling a cache hit in response to the parity of the address tag within the selected cache directory entry matching the computed parity of the address tag field within the presented address; and signalling a cache miss in response to the parity of the address tag within the selected cache directory entry not matching the computed parity of the address tag field within the presented address.

24. The method of claim 19, further comprising:

storing all address tags having an even parity in a first portion of a cache directory; and storing all address tags having an odd parity in a second portion of a cache directory differing from the first portion.

25. A method of supporting implied parity within a cache directory, comprising:

storing each address tag having an even parity within a cache directory entry indexed by an index having a first logical value for a bit within the index; and storing each address tag having an odd parity within a cache directory entry indexed by an index having a second logical value different than the first logical value for the bit.

26. A method of supporting implied parity within a cache directory, comprising:

storing each address tag having an even parity within one of a plurality of cache directory entries indexed by an index having a logical zero as a most significant bit within the index; and storing each address tag having an odd parity within one of a plurality of cache directory entries indexed by an index having a logical one as the most significant bit within the index.

* * * * *